United States Patent Office 3,544,561
Patented Dec. 1, 1970

3,544,561
**10-SUBSTITUTED DIBENZ[b,f][1,4]
OXAZEPIN-11(10H)-ONES**
Gunther Schmidt and Hans Machleidt, Biberach (Riss), and Hans Klupp, Ingelheim am Rhein, Germany, assignors to Boehringer Ingelheim G.m.b.H., Ingelheim am Rhein, Germany, a corporation of Germany
No Drawing. Filed Jan. 27, 1967, Ser. No. 612,097
Claims priority, application Germany, Jan. 28, 1966,
T 30,351
Int. Cl. C07d 87/00
U.S. Cl. 260—239.3                 10 Claims

ABSTRACT OF THE DISCLOSURE

The compounds are of the class of dibenz[b,f][1,4]-oxazepin-11(10H)-ones having an aminocarbonyl-alkyl substituent attached to the nitrogen atom in the 10-position, which are useful as sedatives, anticonvulsives, analgesics, antipyretics, antiphlogistics and hypotensives.

---

This invention relates to novel 10-substituted dibenz[b,f][1,4]oxazepin-11(10H)-ones and non-toxic, pharmacologically acceptable acid addition salts thereof, as well as to various methods of preparing these compounds.

More particularly, the present invention relates to novel substitution products of dibenz[b,f][1,4]oxazepin - 11 (10H)-ones of the formula

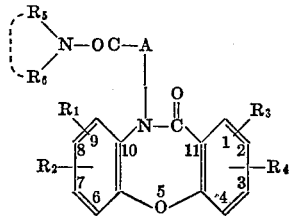

(I)

wherein:

$R_1$, $R_2$, $R_3$ and $R_4$, which may be identical to or different from each other, are each hydrogen, halogen, alkyl, alkoxy, alkylmercapto, acyl, trifluoromethyl or nitro, $R_5$ is hydrogen, alkyl, hydroxyalkyl, cycloalkyl, alkenyl, amino, carbamoyl or

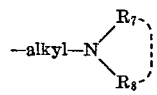

where:

$R_7$ and $R_8$, which may be identical or different from each other, are each alkyl or, together with the nitrogen atom to which they are attached, form a basic saturated heterocyclic ring which may comprise a further heteroatom and/or may have a lower alkyl substituent attached to a ring atom thereof, $R_6$ is hydrogen, alkyl, hydroxyalkyl, cycloalkyl or alkenyl, $R_5$ and $R_6$, together with each other and the nitrogen atom to which they are attached, form a 5- to 7-membered basic saturated heterocyclic ring which may comprise an additional oxygen, sulfur or nitrogen atom and/or may have a lower alkyl, hydroxyalkyl, acetoxyalkyl, acyl or aralkyl substituent attached to a ring atom thereof, and A is a bivalent straight or branched saturated aliphatic hydrocarbon which may have one or more phenyl substituents attached thereto, and their non-toxic, pharmacologically acceptable acid addition salts.

A compound of the Formula I may be prepared by a number of methods involving well known chemical principles; however, the following methods have proved to be most convenient and efficient:

Method A.—By transforming a dibenz[b,f][1,4]oxazepin-11(10H)one of the formula

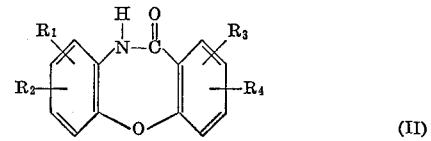

(II)

wherein $R_1$ through $R_4$ have the same meanings as in Formula I, into the corresponding 10-alkali metal compound, and reacting the latter with a halocarboxylic acid amide of the formula

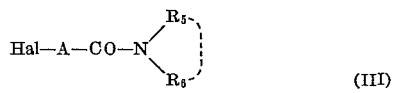

(III)

wherein A, $R_5$ and $R_6$ have the same meanings as in Formula I and Hal is chlorine, bromine or iodine.

The transformation of the dibenz[b,f][1,4]oxazepin-11 (10H)-one into the corresponding 10-alkali metal compound is effected, for example, by reacting compound II with an alkali metal hydroxide, alkali metal alcoholate, alkali metal amide or alkali metal hydride, preferably at elevated temperatures and in the presence of an inert organic solvent; if the transformation is carried out with the aid of an alkali metal hydroxide, an aqueous organic solvent may also be used.

The resulting solution or suspension of the 10-alkali metal dibenz[b,f][1,4]oxazepin-11(10H)-one may then be used as such for the reaction with the halocarboxylic acid amide of the Formula III; this reaction is carried out at elevated temperatures, preferably at the boiling point of the particular solvent which was used for the formation of the 10-alkali metal compound. The reaction mixture is subsequently worked up in customary fashion to isolate the desired reaction product.

Method B.—By reacting a 10-carbalkoxyalkyl-substituted dibenz[b,f][1,4]oxazepin-11(10H)-one of the formula

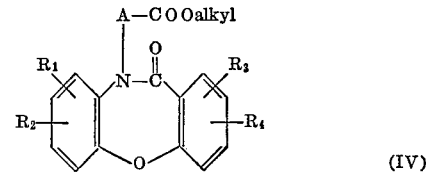

(IV)

wherein $R_1$ through $R_4$ and A have the same meanings as in Formula I, the with a secondary amine of the formula

(V)

wherein $R_5$ and $R_6$ have the same meanings as in Formula I.

The reaction is carried out with a substantial excess of the amine V over and above the stoichiometric amount required for reaction with compound IV, and advantageously in the presence of an inert organic solvent, at elevated temperatures, preferably at a temperature above 150° C. In those instances where the amine V or the solvent has a relatively low boiling point, it is advantageous to perform the reaction in a closed vessel.

Method C.—By transforming a 10-carboxyalkyl-substituted dibenz[b,f][1,4]oxazepin-11(10H)-one of the formula

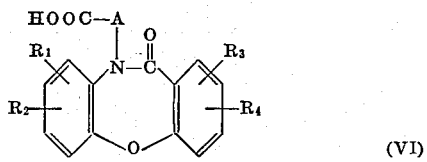

(VI)

wherein $R_1$ through $R_4$ and A have the same meanings as in Formula I, into a corresponding carboxylic acid halide and reacting the latter with a secondary amine of the Formula V.

The transformation of the carboxylic acid VI into a corresponding acid halide is preferably effected with the aid of a thionyl halide or phosphorus halide. After distilling off the excess unreacted halogenating agent, the acid halide is reacted, without further purification, with the amine V in the presence of an acid-binding agent and advantageously in the presence of an inert organic solvent, at elevated temperatures and most advantageously at or near the boiling point of the particular solvent which is used. By "acid-binding agent" we mean an agent capable of tying up or neutralizing the acid released by the reaction; examples of such agents are inorganic or tertiary organic bases, such as sodium carbonate, sodium bicarbonate, tertiary amines and the like. However, a calculated excess of the secondary amine of the formula V over and above the amount stoichiometrically required for reaction with compound VI may also serve as the acid-binding agent, and a still greater excess of amine V may also serve as the solvent medium for the reaction.

Method D.—For the preparation of a compound of the Formula I wherein $R_5$ and $R_6$ are hydrogen, by subjecting a 10-cyanoalkyl-substituted dibenz[b,f][1,4]oxazepin-11(10H)-one of the formula

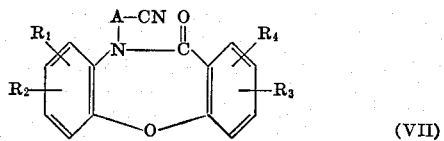

(VII)

wherein $R_1$ through $R_4$ and A have the same meanings as in Formula I, to acid hydrolysis with a strong mineral acid, such as concentrated sulfuric acid. The hydrolysis is begun while cooling with ice and brought to conclusion at room temperature or moderately elevated temperatures.

A free base of the Formula I obtained by any one of Methods A through D above may be converted into a non-toxic, pharmacologically acceptable acid addition salt thereof by customary methods; for example, by dissolving the free base in an inert solvent and acidifying the solution with the desired inorganic or organic acid. Examples of acids which will form non-toxic acid addition salts with a free base of the Formula I include, but are not limited to, hydrochloric acid, hydrobromic acid, sulfuric acid, phosphoric acid, tartaric acid, citric acid, maleic acid, fumaric acid, succinic acid, 8-chlorotheophylline and the like.

The starting compounds used in Methods A through D above are known compounds and/or may be prepared by well known procedures. Thus, compounds of the Formula II are described in the literature; a compound of the Formula IV or VI may be obtained by reacting a corresponding 10-alkyl metal-substituted dibenz[b,f][1,4]oxazepin-11(10H)-one with a haloalkyl-carboxylic acid alkyl ester or haloalkyl-carboxylic acid, respectively; and a compound of the Formula VII may be prepared by reacting a corresponding 10-alkali metal-substituted dibenz[b,f][1,4]oxazepin-11(10H)-one with a haloalkyl-carboxylic acid nitrile. A compound of the Formula VII wherein A is a saturated aliphatic hydrocarbon of two carbon atoms may best be obtained by subjecting a compound of the Formula II to an addition reaction with acrilic nitrile in the presence of a basic catalyst pursuant to known methods.

The following examples illustrate the preparation of a few starting compounds required for the preparation of various compounds according to the present invention:

EXAMPLE A

Preparation of dibenz[b,f][1,4]oxazepin-11(10H)-one-10-acetonitrile 106 gm. (0.5 mol) of dibenz [b,f][1,4]oxazepin-11(10H)-one and 42 gm. (0.6 mol) of potassium methylate were dissolved in 1 liter of warm absolute dioxane. To the resulting solution, a solution of 38 gm. (0.5 mol) of chloroacetonitrile in 100 cc. of absolute dioxane was added dropwise, and then the mixture was refluxed for three hours. Thereafter, the precipitated potassium chloride was filtered off, the filtrate was evaporated in vacuo, the residue was dissolved in 1 liter of chloroform, and the solution was extracted with an aqueous sodium bicarbonate solution and then washed with water. The chloroform solution was finally evaporated in vacuo, and the residue was fractionally distilled in vacuo. The fraction passing over between 195 and 200° C. at 0.1 mm. Hg was collected and recrystallized from isopropanol, yielding 45% of theory of dibenz[b,f][1,4]oxazapin-11(10H)-one-10-acetonitrile, M.P. 136–137° C.

Analysis.—Calculated for $C_{15}H_{10}N_2O_2$ (molecular weight=250.3) (percent): N, 11.19. Found (percent): N, 11.04.

EXAMPLE B

Preparation of dibenz [b,f][1,4]oxazepin-11(10H)-one-10-propionitrile 21.1 gm. of dibenz [b,f][1,4]oxazepin-11(10H)-one were suspended, while stirring, in 50 cc. of acrylonitrile, and the suspension was admixed with 0.3 cc. of Triton B (a methanolic 40% solution of trimethyl benzyl ammonium hydroxide). The mixture was stirred for about 50 hours at 40° C., whereby a solution was formed. The excess unreacted acrylonitrile was distilled off in vacuo, the residue was admixed with dilute aqueous acetic acid, and the mixture was extracted with chloroform. The chloroform extract solution was washed first with an aqueous sodium bicarbonate solution and then with water, dried over sodium sulfate, the chloroform was distilled off, and the residue was fractionally distilled in vacuo. The fraction passing over between 190 and 195° C. at 0.15 mm. Hg was collected, yielding 95% of theory of dibenz[b,f][1,4]oxazepin-11(10H)-one-10-propionitrile.

Analysis.—Calculated for $C_{16}H_{12}N_2O_2$ (molecular weight=264.3) (percent): C, 72.72; H, 4.58; N, 10.60. Found (percent): C, 72.70; H, 4.66; N,10.92.

EXAMPLE C

Using a procedure analogous to that described in Example A, dibenz[b,f][1,4]oxazepin-11(10H)-one-10-butyronitrile, B.P. 190–195° C. at 0.05 mm. Hg, M.P. 71° C. (from gasoline), was prepared from dibenz[b,f][1,4]oxazepin-11(10H)-one, potassium ethylate and γ-chlorobutyronitrile in absolute dioxane. The yield was 58% of theory.

Analysis.—Calculated for $C_{17}H_{14}N_2O_2$ (molecular weight=278.3) (percent): C, 73.37; H, 5.07; N, 10.07. Found (percent): C, 73.70; H, 5.17; N, 10.02.

EXAMPLE D

Using a procedure analogous to that described in Example A, dibenz[b,f][1,4]oxazepin-11(10H)-one-10-acetic acid ethyl ester, B.P. 180–182° C. at 0.3 mm. Hg, M.P. 126–127° C. (from isopropanol), was prepared from dibenz[b,f][1,4]oxazepin-11(10H)-one, potassium methylate and chloroacetic acid ethyl ester in absolute dioxane. The yield was 80% of theory.

*Analysis.*—Calculated for $C_{17}H_{15}NO_4$ (molecular weight=297.3) (percent): C, 68.68; H, 5.09; N, 4.71. Found (percent): C, 68.90; H, 5.08; N, 4.90.

EXAMPLE E

Using a procedure analogous to that described in Example A, 3-chloro-dibenz[b,f][1,4]oxazepin-11(10H)-one-10-acetonitrile, M.P. 150–152° C. (from ethanol), was prepared from 3-chloro-dibenz[b,f][1,4]oxazepin-11 (10H)-one, potassium methylate and chloroacetonitrile in a mixture of equal parts by volume of absolute dioxane and tertiary butanol. The yield was 35% of theory.

*Analysis.*—Calculated for $C_{15}H_9ClN_2O_2$ (molecular weight, 284.7) (percent): C, 63.28; H, 3.18; N, 9.84; Cl, 12.46. Found (percent) C, 63.70; H, 3.47; N, 9.96; Cl, 12.93.

EXAMPLE F

Using a procedure analgous to that described in Example B, 3-chloro-dibenz[b,f][1,4]oxazepin-11(10H)-one-10-propionitrile, M.P. 145–147° C. (from ethanol), was prepared from 3-chloro-dibenz[b,f][1,4]oxazepin-11 (10H)-one and acrylonitrile with Triton B as a catalyst. The yield was 50% of theory.

*Analysis.*—Calculated for $(C_{16}H_{11}ClN_2O_3$ (molecular weight=298.7) (percent): 64.32; H, 3.71; N, 9.38; Cl, 11.87. Found (percent): C, 64.20; H, 3.84; N, 9.18; Cl, 11.52.

EXAMPLE G

Using a procedure analogous to that described in Example A, 8-chloro-dibenz[b,f][1,4]oxazepin-11(10H)-one-10-acetonitrile, M.P. 142–143° C. (from ethanol) was prepared from 8 - chloro-dibenz[b,f][1,4]oxazepin - 11 (10H)-one, potassium methylate and chloroacetonitrile in a mixture of equal parts by volume of absolute dioxane and tertiary butanol. The yield was 60% of theory.

*Analysis.*—Calculated for $C_{15}H_9ClN_2O_2$ (molecular weight=284.7) (percent): C, 63.28; H, 3.18. Found (percent): C, 63.80; H, 3.37.

EXAMPLE H

Preparation of dibenz[b,f][1,4]oxazepin-11(10H)-one-10-acetic acid 71.9 gm. of dibenz[b,f][1,4]oxazepin-11(10H)-one-10-acetic acid ethyl ester were introduced into a solution of 14 gm. of potassium hydroxide in a mixture of 200 cc. of methanol and 200 cc. of water at room temperature, and the mixture was refluxed for one hour. Thereafter, the reaction mixture was diluted with about 200 cc. of water and filtered through activated charcoal, and the hot filtrate was diluted with additional 400 cc. of water, then acidified with dilute hydrochloric acid and allowed to cool slowly. The crystalline precipitate formed thereby was collected and recrystallized from isopropanol, yielding 82% of theory of dibenz[b,f][1,4]oxazepin-11(10H)-one-10-acetic acid, M.P. 201° C.

*Analysis.*—Calculated for $C_{15}H_{11}NO_4$ (molecular weight=269.3) (percent): C, 66.91; H, 4.12; N, 5.20. Found (percent): C, 66.90; H, 4.21; N, 5.14.

EXAMPLE I

Preparation of dibenz[b,f][1,4]oxazepin-11(10H)-one-10-propionic acid

Dibenz[b,f][1,4]oxazepin-11(10H)-one was reacted with acrylic acid methyl ester in the manner described in Example B, except that the reaction time was shortened to between two and three hours, and the reaction mixture was worked up in the indicated manner. After distilling off the chloroform, raw dibenz[b,f][1,4]oxazepin-11 (10H)-one-10-propionic acid methyl ester was obtained as a highly viscous oil. This raw ester was then subjected to acid hydrolysis as described in Example H, and the hydrolysis product was recrystallized from ethylacetate, yielding 60% of theory of dibenz[b,f][1,4]oxazepin-11 (10H)-one-10-propionic acid, M.P. 140–142° C.

*Analysis.*—Calculated for $C_{16}H_{13}NO_4$ (molecular weight=283.3) (percent): C, 67.84; H, 4.63; N, 4.94. Found (percent): C, 67.70; H, 4.88; N, 4.89.

EXAMPLE J

Using a procedure analogous to that described in Example E, 2-methyl-dibenz[b,f][1,4]oxazepin-11(10H)-one-10-acetonitrile, B.P. 190–192° C. at 0.06 mm. Hg, M.P. 120–121° C. (from isopropanol), was prepared from 2 - methyl - dibenz[b,f][1,4]oxazepin-11(10H) - one and chloroacetonitrile. The yield was 70% of theory.

The following examples further illustrate the present invention and will enable others skilled in the art to understand it more completely. It should be understood, however, that the invention is not limited to the particular examples given below.

EXAMPLE 1

Preparation of dibenz[b,f][1,4]oxazepin-11(10H)-one-10-acetic acid ethyl amide by Method A 16.8 gm. (0.08 mol) of dibenz[b,f][1,4]oxazepin-11(10H)-one and 6.0 gm. (0.08 mol) of 95% potassium methylate were dissolved in 100 cc. of warm absolute dioxane, and then a solution of 10.0 gm. (0.08 mol) of chloroacetic acid ethyl amide in 10 cc. of absolute dioxane was added dropwise thereto. Thereafter, the mixture was refluxed for three hours, the precipitated potassium chloride was filtered off, and the filtrate was evaporated in vacuo. The residue was dissolved in 100 cc. of chloroform, and the solution was extracted with an aqueous sodium bicarbonate solution and washed with water. The chloroform solution was evaporated in vacuo, and the residue was recrystallized from aqueous 50% dimethylformamide, yielding 80% of theory of dibenz [b,f][1,43]oxazepin-11(10H)-one-10-acetic acid ethyl amide of the formula

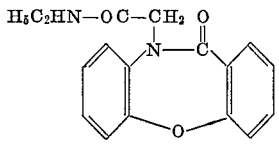

*Analysis.*—Calculated for $C_{17}H_{16}N_2O_3$ (molecular weight, 296.3) (percent): C, 68.91; H, 5.44; N, 9.45. Found (percent): C, 68.90; H, 5.58; N, 9.43.

EXAMPLE 2

Using a procedure analogous to that described in Example 1, dibenz[b,f][1,4]oxazepin-11(10H)-one-10-acetamide, M.P. 197–199° C. (from isopropanol), was prepared from dibenz[b,f][1,4]oxazepin-11(10H)-one, potassium methylate and chloroacetamide in absolute dioxane. The yield was 37% of theory.

EXAMPLE 3

Preparation of dibenz[b,f][1,4]oxazepin-11(10H)-one-10-acetamide by Method D 15 gm. of dibenz[b,f][1,4]oxazepin-11(10H)-one-10-acetonitrile were dissolved in 150 cc. of concentrated sulfuric acid at 0° C., while stirring. The solution was allowed to warm gradually to room temperature, and was then allowed to stand overnight. Thereafter, it was poured over ice, and the aqueous acid solution was neutralized with sodium hydroxide. The precipitate formed thereby was collected by vacuum filtration, washed with water and recrystallized from isopropanol. 70% of theory of dibenz[b,f][1,4]oxazepin - 11(10H) - one - 10 - acetamide, M.P. 197–199° C. of the formula

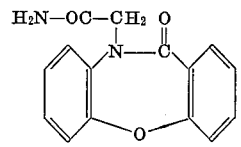

were obtained.

Analysis.—Calculated for $C_{15}H_{12}N_2O_3$ (molecular weight=268.3) (percent): C, 67.16; H, 4.51; N, 10.44. Found (percent): C, 67.25; H, 4.53; N, 10.33.

EXAMPLE 4

Using a procedure analogous to that described in Example 3, dibenz[b,f][1,4]oxazepin-11(10H)-one-10-propionamide, M.P. 164–166° C. (from isopropanol), was prepared from dibenz[b,f][1,4]oxazepin-11(10H)-one-10-propionitrile. The yield was 80% of theory.

Analysis.—Calculated for $C_{16}H_{14}N_2O_3$ (molecular weight=282.3) (percent): C, 68.08; H, 5.00; N, 9.92. Found (percent): C, 68.00; H, 5.09; N, 9.74.

EXAMPLE 5

Using a procedure analogous to that described in Example 3, dibenz[b,f][1,4]oxazepin-11(10H)-one-10-butyramide, M.P. 148–151° C. (from isopropanol), was prepared from dibenz[b,f][1,4]oxazepin-11(10H)-one-10-butyronitrile. The yield was 85% of theory.

Analysis.—Calculated for $C_{16}H_{14}N_2O_3$ (molecular weight=296.3) (percent): C, 68.91; H, 5.44; N, 9.45. Found (percent): C, 68.90; H, 5.66; N, 9.35.

EXAMPLE 6

Using a procedure analogous to that described in Example 1, dibenz[b,f][1,4]oxazepin-11(10H)-one-10-acetic acid methyl amide, M.P. 195° C. (from isopropanol), was prepared from dibenz[b,f][1,4]oxazepin-11(10H)-one, potassium methylate and chloroacetic acid methyl amide in absolute dioxane. The yield was 63% of theory.

Analysis.—$C_{16}H_{14}N_2O_3$ (molecular weight=282.3) (percent):xa,-[( M/x₃ x u-b Analysis.—Calculated for $C_{16}H_{14}N_2O_3$ (molecular weight=282.3) (percent): C, 68.08; H, 5.00; N, 9.92. Found (percent): C, 68.00; H, 5.00; N, 9.83.

EXAMPLE 7

Using a procedure analogous to that described in Example 1, dibenz[b,f][1,4]oxazepin-11(10H)-one-10-acetic acid dimethyl amide, M.P. 126–129° C. (from ethylacetate), was prepared from dibenz[b,f][1,4]oxazepin-11(10H)-one, potassium methylate and chloroacetic acid dimethylamide in absolute dioxane. The yield was 60% of theory.

Analysis.—Calculated for $C_{17}H_{16}N_2O_3$ (molecular weight=296.3) (percent): C, 68.91; H, 5.44; N, 9.45. Found (percent): C, 69.15; H, 5.58; N, 9.38.

EXAMPLE 8

Using a procedure analogous to that described in Example 1, dibenz[b,f][1,4]oxazepin-11(10H)-one-10-acetic acid diethylamide, B.P. 200–205° C. at 0.02 mm. Hg., was prepared from dibenz[b,f][1,4]oxazepin-11(10H)-one, potassium methylate and chloroacetic acid diethylamide in absolute dioxane. The yield was 62% of theory.

Analysis.—Calculated for $C_{19}H_{20}N_2O_3$ (molecular weight=324.4) (percent): C, 70.35; H, 6.21; N, 8.64. Found (percent): C, 70.20; H, 6.41; N, 8.76.

EXAMPLE 9

Using a procedure analogous to that described in Example 1, dibenz[b,f][1,4]oxazepin-11(10H)-one-10-acetic acid diallylamide, B.P. 210–215° C. at 0.02 mm. Hg, M.P. 82–83° C. (from aqueous methanol), of the formula $(CH_2=CH—CH_2)_2N—OC—CH_2$ O
[structure]

was prepared from dibenz[b,f][1,4]oxazepin-11(10H)-one, potassium methylate and chloroacetic acid diallylamide in absolute dioxane. The yield was 45% of theory.

Analysis.—Calculated for $C_{21}H_{20}N_2O_3$ (molecular weight=348.4) (percent): C, 72.40; H, 5.79; N, 8.04. Found (percent): C, 72.30; H, 6.03; N, 8.21.

EXAMPLE 10

Using a procedure analogous to that described in Example 1, dibenz[b,f][1,4]oxazepin-11(10H)-one-10-acetic acid di-n-butylamide, B.P. 250–252° C. at 0.2 mm. Hg., was prepared from dibenz[b,f][1,4]oxazepin-11(10H)-one, potassium methylate and chloroacetic acid di-n-butylamide. The yield was 65% of theory.

EXAMPLE 11

Preparation of dibenz[b,f][1,4]oxazepin-11(10H)-one-10-acetic-acid di-n-butylamide by Method B A mixture of 4.0 gm. of dibenz[b,f][1,4]oxazepin-11(10H)-one-10-acetic acid ethyl ester and 20 cc. of di-n-butylamine was heated for seven hours at 240–250° C. in a sealed tube. Thereafter, the excess unreacted amine was distilled off, and the residue was fractionally distilled in vacuo. The fraction passing over between 250–252° C. at 0.2 mm. Hg was identified to be dibenz[b,f][1,4]oxazepin-11(10H)-one-10-acetic acid di-n-butylamide. The yield was 58% of theory.

Analysis.—Calculated for $C_{23}H_{28}N_2O_3$ (molecular weight=380.5) (percent): C, 72.61; H, 7.42; N, 7.36. Found (percent): C, 72.80; H, 7.42; N, 7.13.

EXAMPLE 12

Preparation of dibenz[b,f][1,4]oxazepin-11(10H)-one-10-acetic acid hydrazide by Method B A mixture of 10 gm. of dibenz[b,f][1,4]oxazepin-11(10H)-one-10-acetic acid ethyl ester, 10 cc. of 80% hydrazine hydrate and 50 cc. of ethanol was refluxed for 90 minutes. Thereafter, the ethanol and the excess unreacted hydrazine hydrate were distilled off, and the residue was recrystallized from aqueous ethanol. 95% of theory of dibenz[b,f][1,4]oxazepin-11(10H)-one-10-acetic acid hydrazide, M.P. 160–162° C., of the formula $H_2N—HN—OC—CH_2$ O
[structure]

were obtained.

Analysis.—Calculated for $C_{15}H_{13}N_3O_3$ (molecular weight=283.3) (percent): C, 63.60; H, 4.63; N, 14.63. Found (percent): C, 63.90; H, 4.73; N, 14.57.

EXAMPLE 13

Preparation of 3-chloro-dibenz[b,f][1,4]oxazepin-11(10H)-one-10-acetamide by Method D 7.2 gm. of 3-chloro-dibenz[b,f][1,4]oxazepin-11(10H)-one-10-acetonitrile were introduced over a period of 45 minutes into 50 cc. of concentrated sulfuric acid at −15° C. The resulting mixture was then stirred first at −15° C. for two hours and subsequently at room temperature for one hour, and thereafter it was poured over ice. The aqueous reaction mixture was then worked up as described in Example 3, yielding 45% of theory of 3-chloro-dibenz[b,f][1,4]oxazepin-11(10H)-one-10-acetamide, M.P. 217–219° C. (from ethanol), of the formula $H_2N—OC—CH_2$ O
[structure with Cl]

Analysis.—Calculated for $C_{15}H_{11}ClN_2O_3$ (molecular weight, 302.7) (percent): C, 59.51; H, 3.66; N, 9.26; Cl, 11.71. Found (percent): C, 59.70; H, 3.82; N, 9.34; Cl, 11.49.

EXAMPLE 14

Using a procedure analogous to that described in Example 13, 3-chloro-dibenz[b,f][1,4]oxazepin-11(10H)-one-10-propionamide, M.P. 182–183° C: (from isopropanol), was prepared from 3-chloro-dibenz[b,f][1,4]oxazepin-11 (10H)-one-10-propionitrile. The yield was 65% of theory.

*Analysis.*—Calculated for $C_{16}H_{13}ClN_2O_3$ (molecular weight, 316.7) (percent): C, 60.67; H, 4.14; N, 8.84; Cl, 11.20. Found (percent): C, 61.00; H, 4.32; N, 8.65; Cl, 10.95.

EXAMPLE 15

Using a procedure analogous to that described in Example 1, 3-chloro-dibenz[b,f][1,4]oxazepin-11(10H)-one-10-acetic acid dimethylamide, M.P. 175–176° C. (from ethanol), was prepared from 3-chloro-dibenz[b,f][1,4] oxazepin-11(10H)-one, potassium methylate and chloroacetic acid dimethylamide in a mixture of equal parts by volume of absolute dioxane and tertiary butanol. The yield was 50% of theory.

*Analysis.*—Calculated for $C_{17}H_{15}ClN_2O_3$ (molecular weight, 330.8) (percent): C, 61.73; H, 4.57; N, 8.47; Cl, 10.72. Found (percent): C, 61.50; H, 4.54; N, 8.28; Cl, 10.78.

EXAMPLE 16

Using a procedure analogous to that described in Example 13, 8-chloro-dibenz[b,f][1,4]oxazepin-11(10H)-one-10-acetamide, M.P. 179–181° C. (from acetonitrile), was prepared from 8 - chloro - dibenz[b,f][1,4]oxazepin-11 (10H)-one-acetonitrile. The yield was 30% theory.

*Analysis.*—Calculated for $C_{15}H_{11}ClN_2O_3$ (molecular weight, 302.7) (percent): C, 59.51; H, 3.66; N, 9.26; Cl, 11.71. Found (percent): C, 59.20; H, 3.45; N, 9.15; Cl, 11.56.

EXAMPLE 17

Using a procedure analogous to that described in Example 1, raw dibenz[b,f][1,4]oxazepin-11(10H)-one-10-acetic acid(N'-methyl)-piperazide hydrochloride, M.P. 110–115° C. (decomp.), of the formula

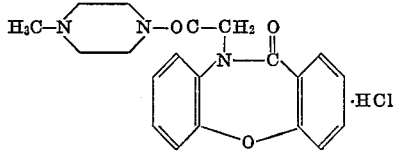

was prepared from dibenz[b,f][1,4]oxazepin-11(10H)-one, potassium methylate and chloroacetic acid (N'-methyl)-piperazide in absolute dioxane, except that after washing the chloroform extract solution with sodium bicarbonate and water, it was extracted with aqueous 10% hydrochloric acid, and the extract solution was evaporated in vacuo.

For conversion into the free base, the raw hydrochloride was dissolved in water, and the solution was made alkaline with dilute sodium hydroxide and was then extracted with methylene chloride. The extract solution was evaporated, and the residue was recrystallized from absolute ether, yielding dibenz[b,f][1,4]oxazepin-11 (10H)-one-10-acetic acid (N'-methyl-piperazide, M.P. 157–158° C.

*Analysis.*—Calculated for $C_{20}H_{21}N_3O_3$ (molecular weight, 351.4) (percent): C, 68.36; H, 6.02; N, 11.96. Found (percent): C, 68.40. H, 6.27; N, 12.13.

EXAMPLE 18

Preparation of dibenz[b,f][1,4]oxazepin-11(10H-one-10-acetic acid morpholide by Method C 6 gm. (0.025 mol) of dibenz[b,f][1,4]oxazepin-11 (10H)-one-10-acetic acid were suspended in 100 cc. of absolute benzene, and the suspension was heated to its boiling point. While continuing to boil the suspension, a solution of 3.1 gm. (0.026 mol) of thionylchloride in 10 cc. of absolute benzene was added dropwise over a period of 30 minutes, and then the reaction mixture was refluxed for 45 minutes. A solution of dibenz[b,f] [1,4]oxazepin-11(10H)-one-10-acetylchloride was thus obtained. This solution was allowed to cool, 10 cc. of morpholine were added dropwise thereto over a period of 30 minutes, and the mixture was refluxed for two hours. Thereafter, the resulting solution was allowed to cool, washed first with water, then with dilute sodium hydroxide and then again with water, dried over sodium sulfate and finally evaporated in vacuo. The residue was recrystallized from isopropanol, yielding 55% of theory of dibenz[b,f][1,4]oxazepin-11(10H)-one-10-acetic acid morpholide, M.P. 162–163° C., of the formula

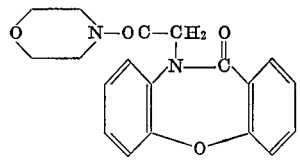

*Analysis.*—Calculated for $C_{19}H_{18}N_2O_4$ (molecular weight, 338.4) (percent): C, 67.45; H, 5.36; N, 8.28. Found (percent): C, 67.45; H, 5.37; N, 8.16.

EXAMPLE 19

Using a procedure analogous to that disclosed in Example 13, 2-methyl-dibenz[b,f][1,4]oxazepin-11(10H)-one-10-acetamide, M.P. 205–206° C. (from ethanol), was prepared from 2-methyl-dibenz[b,f][1,4]oxazepin-11(10H)-one-10-acetonitrile. The yield was 58% of theory.

*Analysis.*—Calculated for $C_{16}H_{14}N_2O_3$ (molecular weight 282.3) (percent): C, 68.08; H, 5.00; N, 9.29. Found (percent): C, 68.00; H, 4.93; N, 10.05.

EXAMPLE 20

2 - methyl - dibenz[b,f][1,4]oxazepin-11(10H)-one-10-propionamide was prepared from 2-methyl-dibenz[b,f][1,4]oxazepin-11(10H)-one-10-propionitrile (M.P. 106–108° C. from isopropanole) and concentrated sulfuric acid according to the method described in Example 3, M.P. 163–165° C. (recrystallized from ethanol). Yield: 40% of theory.

*Analysis.*—Calculated for $C_{17}H_{16}N_2O_3$ (296.3) (percent): C, 68.91; H, 5.44; H, 9.45. Found (percent): C, 68.70; 5.52; N, 9.19.

EXAMPLE 21

3 - chloro - 8 - methyl-dibenz[b,f][1,4]oxazepin-11-(10H)-one-10-propionamide was prepared from 3-chloro-8 - methyldibenz[b,f][1,4]oxazepin-11(10H)-one-10-propionitrile (M.P. 141–144° C. from isopropanol) and concentrated sulfuric acid by the method described in Example 13. (M.P. 175.5–176.5° C. (from aqueous ethanol). Yield: 45% of theory.

*Analysis.*—Calculated for $C_{17}H_{15}ClN_2O_3$ (330.8) (percent): C, 61.73; H, 4.57; N, 8.47. Found (percent): C, 62.20; H, 4.65; N, 8.44.

EXAMPLE 22

Dibenz[b,f][1,4]oxazepin - 11(10H) - one-10-acetic acid-hexamethyleneimide was prepared from dibenz[b,f] [1,4]oxazepin-11(10H)-one, potassium methylate and chloroacetic acid-hexamethyleneimide in absolute dioxane according to the method described in Example 1. $B.P._{0.02}$ 210° C. M.P. 92–96° C. Yield: 35% of theory.

*Analysis.*—Calculated for $C_{21}H_{22}N_2O_3$ (350.4) (percent): C, 71.98; H, 6.33; N, 7.99. Found (percent): C, 72.05; H, 6.28; N, 7.97.

EXAMPLE 23

Preparation of dibenz[b,f][1,4]oxazepin-11(10H)-one-10-propionic acid methylamide 14.2 g. (0.05 mol) dibenz[b,f][1,4]oxazepin-11(10H)-one-10-propionic acid (prepared according to Example I) and 6.0 g. (0.05 mol) thionylchloride are heated in 200 ml. of absolute benzene under reflux until gas development is achieved. Thus a solution of dibenz[b,f] [1,4]oxazepin-11(10H)-one-10-propionic acid chloride in absolute benzene is obtained, which is suitable for further reaction without isolation of the acid chloride.

To the cooled solution of acid chloride in benzene, produced as described above, a solution of 12.0 g. (0.38 mol) methylamine in 200 ml. absolute dioxane is added dropwise and heated for 30 minutes more under reflux. The solvents are distilled off in vacuo, the residue is mixed with dilute acetic acid and shaken out with chloroform. The chloroform extract is washed with dilute sodium hydroxide solution and water and evaporated. The residue is recrystallized from 25% aqueous dimethylformamide. M.P. (137–139° C. The yield is 80% of theory.

*Analysis.*—Calculated for $C_{17}H_{16}N_2O_3$ (296.3) (percent): C, 68.91; H, 5.44; N, 9.45. Found (percent): C, 68.80; H, 5.43; N, 9.53.

EXAMPLE 24

Dibenz[b,f][1,4]oxazepin - 11(10H) - one-10-acetic acid-(N-methyl-N-cyclohexyl)-amide was prepared from dibenz[b,f][1,4]oxazepin-11(10H)-one, potassium methylate and chloroacetic - acid-(N-methyl-N-cyclohexyl)-amide in absolute dioxane according to the method described in Example 1.

B.P.$_{0.03}$ 245–248° C.; M.P. 101–103° C. Yield: 60% of theory.

*Analysis.*—Calculated for $C_{22}H_{24}N_2O_3$ (364.4) (percent): C, 72.51; H, 6.64; N, 7.69. Found (percent): C, 72.80; H, 6.50; N, 7.70.

EXAMPLE 25

Dibenz[b,f,][1,4]oxazepin - 11(10H)-one-10-propionic acid-n-propylamid was prepared from dibenz[b,f][1,4]oxazepin-11(10H)-one-10-propionic acid chloride (prepared according to Example 23) and n-propylamine in absolute benzene according to the method described in Example 23. M.P. 90–91° C. (from toluene). Yield: 85% of theory.

*Analysis.*—Calculated for $C_{19}H_{20}N_2O_3$ (324.4) (percent): C, 70.35; H, 6.21; N, 8.64. Found (percent): C, 70.60; H, 6.38; N, 8.51.

EXAMPLE 26

Dibenz[b,f][1,4]oxazepin - 11(10H) - one-10-propionic acid-ureide was prepared from dibenz[b,f][1,4]oxazepin-11(10H) - one - 10 - propionic acid chloride (prepared according to Example 23) and urea suspended in absolute dioxane according to the method described in Example 23. After heating for three hours under reflux it is evaporated in vacuo. The residue is washed out with sodium carbonate solution and recrystallized from n-butanol. M.P.=207–209° C. Yield: 85% of theory.

*Analysis.*—Calculated for $C_{17}H_{15}N_3O_4$ (325.3) (percent): C, 62.76; H, 4.65; N, 12.92. Found (percent): C, 62.65; H, 4.92; N, 12.38.

EXAMPLE 27

8 - methyl - dibenz[b,f][1,4]oxazepin-11(10H)-one-10-propionic amide was prepared from 8-methyl-dibenz[b,f][1,4]oxazepin-11(10H)-one-10-propionitrile (M.P. 90–91° C. from cyclohexane) and concentrated sulfuric acid according to the method described in Example 3. M.P.=115–117° C. (from aqueous dimethylformamide). Yield: 70% of theory.

*Analysis.*—Calculated for $C_{17}H_{16}N_2O_3$ (296.3) (percent): N, 9.45. Found (percent): N, 9.18.

EXAMPLE 28

Dibenz[b,f][1,4]oxazepin - 11(10H)-one-10-propionic acid-β-diethylamino-ethylamide was prepared from dibenz[b,f][1,4]oxazepin - 11(10H)-one-10-propionic acid chloride and β-diethylaminoethylamine in absolute benzene by refluxing for 30 minutes. B.P. 0.01 220–225° C. Yield: 50% of theory.

*Analysis.*—Calculated for $C_{22}H_{27}N_3O_3$ (381.5) (percent): C, 69.27; H, 7.13; N, 11.02. Found (percent): C, 69.00; H, 7.09; N, 10.82.

EXAMPLE 29

Dibenz[b,f][1,4]oxazepin-11(10H)-one-10-acetic acid-γ-pipecolide was prepared from dibenz[b,f][1,4]oxazepin-11(10H)-one-10-acetylchloride (prepared according to Example 18) and γ-pipecoline according to the method described in Example 18. M.P. 117–118° C. (from dimethylformamide/water). Yield: 35% of theory.

*Analysis.*—Calculated for $C_{21}H_{22}N_2O_3$ (percent): C, 71.98; H, 6.33; N, 7.99. Found (percent): C, 71.70; H, 5.82; N, 8.01.

EXAMPLE 30

Dibenz[b,f][1,4]oxazepin - 11(10H) - one - acetic acid piperidide was prepared from dibenz[b,f][1,4]oxazepin-11(10H)-one-10-acetylchloride (prepared according to Example 18) and piperidine according to the method described in Example 18. M.P. 110–112° C. (from cyclohexane). Yield: 50% of theory.

*Analysis.*—Calculated for $C_{20}H_{20}N_2O_3$ (336.4) (percent): C, 71.41; H, 5.99; N, 8.33. Found (percent): C, 71.35; H, 6.27; N, 7.75.

EXAMPLE 31

Dibenz[b,f][1,4]oxazepin-11(10H)-one-10-acetic acid-(α-ethylpiperidide) was prepared from dibenz[b,f][1,4]-oxazepin-11(10H)-one, potassium methylate and chloroacetic acid-(α-ethylpiperidide) in absolute dioxane according to the method described in Example 1. B.P. 0.07 230° C. M.P. 96–98° C. Yield: 55% of theory.

*Analysis.*—Calculated for $C_{22}H_{24}N_2O_3$ (364.4) (percent): C, 72.51; H, 6.64; N, 7.69. Found (percent): C, 72.30; H, 6.85; N, 7.55.

EXAMPLE 32

Dibenz[b,f][1,4]oxazepin - 11(10H)-one-10-propionic acid-γ-dimethylaminopropyl-amide was prepared from dibenz[b,f][1,4]oxazepin-11(10H)-one-10-propionic acid chloride (prepared according to Example 23) and γ-dimethylaminopropylamine in benzene according to the method described in Example 28. B.P. 0.01 230–240° C. The distillate is dissolved in the calculated quantity of dilute hydrochloric acid. After filtration it is made alkaline again and extracted with ether. The ether residue is dried in a high vacuum at 150° C. Yield: 52% of theory.

*Analysis.*—Calculated for $C_{21}H_{25}N_3O_3$ (367.5) (percent): C, 68.64; H, 6.86; N, 11.44. Found (percent): C, 68.60; H, 7.01; N, 11.38.

EXAMPLE 33

Dibenz[b,f][1,4]oxazepin - 11(10H) - one - acetic acid pyrrolidide was prepared from dibenz[b,f][1,4]oxazepin-11(10H)-one, potassium methylate and chloroacetic acid pyrrolidide according to the method described in Example 1. M.P. 150–152° C. (from cyclohexane). Yield: 60% of theory.

*Analysis.*—Calculated for $C_{19}H_{18}N_2O_3$ (322.4) (percent): C, 70.79; H, 5.63; N, 8.69. Found (percent): C, 70.89; H, 5.73; N, 8.78.

EXAMPLE 34

Dibenz[b,f][1,4]oxazepin - 11(10H)-one-10-propionic acid diethanolamide was prepared from dibenz[b,f][1,4]-oxazepin-11(10H)-one-10-propionic acid chloride (prepared according to Example 23, however in absolute dioxane instead of benzene) with diethanolamine in absolute dioxane according to the method indicated in Example 23. Resin-like mass. Yield: 89% of theory.

*Analysis.*—Calculated for $C_{20}H_{22}N_2O_5$ (370.4) (percent): N, 7.56. Found (percent): N, 7.07.

as active ingredients in customary dosage unit compositions, that is, compositions consisting essentially of an inert pharmaceutical carrier and one dosage unit of the active ingredient, such as tablets, coated pills, solutions, suspensions, emulsions, capsules, wafers, suppositories and the like. One dosage unit of compounds with hypotensive activity, for example 2-nitro-dibenz[b,f][1,4]oxazepin11-(10H)-one-10-propionamide, is from 0.5–20 mgm./kg. body weight; one dosage unit of compounds with anticonvulsive activity, for example dibenz[b,f][1,4]oxazepin-11-(1H)-one-10-acetamide or dibenz[b,f][1,4]oxazepin-11-(10H)-one-10-acetic acid methylamide, is from 5–30 mgm./kg. body weight. In addition to a compound of the instant invention, a dosage unit composition may also comprise one or more other active ingredients.

The following examples illustrate a few pharmaceutical dosage unit compositions comprising a compound of the present invention as an active ingredient. The parts are parts by weight unless otherwise specified.

EXAMPLE 46

Tablets

The tablet composition is compounded from the following ingredients:

|  | Parts |
|---|---|
| Dibenz[b,f][1,4]oxazepin - 11(10H) - one-10-acetamide | 100.0 |
| Lactose | 50.0 |
| Potato starch | 44.0 |
| Gelatin | 4.0 |
| Corn starch | 20.0 |
| Magnesium stearate | 2.0 |
| Total | 220.0 |

Compounding procedure

The dibenzoxazepinone compound is intimately admixed with the lactose and the potato starch, the mixture is moistened with an aqueous 10% solution of the gelatin, the moist mass is forced through a 1.5 mm.-mesh screen, and the granulate obtained thereby is dried at 45° C. and again passed through a 1 mm.-mesh screen. The dry granulate is admixed with the corn starch and the magnesium stearate, and the resulting composition is pressed into 220 mgm.-tablets. Each tablet contains 100 mgm. of the dibenzoxazepinone compound.

EXAMPLE 47

Coated pills

The tablets obtained pursuant to the preceding example are coated with a thin shell consisting essentially of sugar and talcum, and the coated pills are polished with beeswax. Each coated pill weighs approximately 320 mgm. and has the same active ingredient content as the tablets of Example 46.

EXAMPLE 48

Coated pills containing compound of invention and phenyl ethyl barbituric acid as active ingredients The pill core composition is compounded from the following ingredients:

|  | Parts |
|---|---|
| Dibenz[b,f][1,4]oxazepin - 11(10H)-one-10-acetic acid dimethylamide | 100.0 |
| Phenyl ethyl barbituric acid | 50.0 |
| Corn starch | 60.0 |
| Polyvinylpyrrolidone | 8.0 |
| Magnesium stearate | 2.0 |
| Total | 220.0 |

Compounding procedure

The dibenzoxazepinone compound and the barbituric acid compound are admixed with the corn starch, the mixture is moistened with an aqueous 20% solution of the polyvinylpyrrolidone, the moist mass is forced through a 1.5 mm.-mesh screen, and the moist granulate obtained thereby is dried at 45° C. and again passed through a 1 mm.-mesh screen.

The dry granulate is admixed with the magnesium stearate, and the mixture is pressed into 220 mgm.-pill cores, which are subsequently coated with a thin shell consisting essentially of sugar and talcum, and the coated pills are polished with beeswax. Each coated pill weighs approximately 320 mgm. and contains 100 mgm. of the benzoxazepinone compound and 50 mgm. of the barbituric acid compound.

EXAMPLE 49

Tablets with compound of invention showing a hypotensive effect

The tablet composition is compound from the following ingredients:

|  | Parts |
|---|---|
| 2-Nitro-dibenz[b,f][1,4]oxazepin-11(10H -one-10-propion amide | 40.0 |
| Lactose | 43.0 |
| Potato starch | 30.0 |
| Soluble starch | 5.0 |
| Colloidal silicic acid, loose | 1.0 |
| Magnesium stearate | 1.0 |
| Total | 120.0 |

Compounding procedure

The dibenzoxazepinone compound is intimately admixed with the lactose and the potato starch, the mixture is moistened with a 20% aqueous solution of soluble starch, the moist mass is forced through a 1.5 mm.-mesh screen, and the granulate obtained thereby is dried at 45° C. and again passed through a 1 mm.-mesh screen. The dry granulate thus obtained is admixed with the remainder of the inert ingredients, and the mixture is pressed into 120 mgm.-tablets. Each tablet contains 40 mgm. of the active ingredient.

EXAMPLE 50

Coated pills with compound of invention showing a hypotensive effect and two additional active ingredients The pill core composition is compounded from the following ingredients:

|  | Parts |
|---|---|
| Dibenz[b,f][1,4]oxazepin-11(10H)-one-10-propionamide | 40.0 |
| 6-chloro-3,4-dihydro-3-(5-norbornene-2-yl)-2H-1,2,4-benzothiadiazine-7-sulfonamide-1,1-dioxide | 5.0 |
| Reserpine | 0.2 |
| Lactose | 40.5 |
| Potato starch, dry | 20.0 |
| Polyvinylpyrrolidone | 3.0 |
| Tartaric acid | 0.5 |
| Potato starch, undried | 10.0 |
| Magnesium stearate | 0.8 |
| Total | 120.0 |

Compounding procedure

The benzoxazepinone compound, the benzothiadiazine compound, the resperine and the lactose are intimately admixed with each other, the mixture is moistened with an aqueous 15% solution of the polyvinylpyrrolidone which also has the tartaric acid dissolved therein, the moist mass is forced through a 1.5 mm.-mesh screen, and the moist granulate obtained thereby is dried at 40° C. and again passed through a 1 mm.-mesh screen. The dry granulate is admixed with the undried potato starch and the magnesium stearate, and the composition is pressed into 120 mgm.-pill cores, which are subsequently coated with a thin shell consisting essentially of sugar and talcum and

EXAMPLE 35

Dibenz[b,f][1,4]oxazepin-11(10H)-one-10-acetic acid-(4′-benzylpiperazide) was prepared from dibenz[b,f][1,4]-oxazepin-11(10H)-one-10-acetylchloride (prepared according to Example 18) and benzylpiperazine according to the method described in Example 18. M.P. 170–171° C. (from isopropanol). Yield: 20% of theory.

*Analysis.*—Calculated for $C_{26}H_{25}N_3O_3$ (427.5) (percent): C, 73.05; H, 5.89; N, 9.83. Found (percent): C, 72.40; H, 5.89; N, 9.64.

EXAMPLE 36

Dibenz[b,f][1,4]oxazepin-11(10H)-one-10-(α-methyl)-acetamide

Using a procedure analogous to that disclosed in Example 23, dibenz[b,f][1,4]oxazepin-11(10H)-one-10-(α-methyl)-acetic acid chloride is obtained from dibenz[b,f][1,4]oxazepin-11(10H)-one-10-(α-methyl)-acetic acid (M.P. 180–183° C. from ethylacetate) and thionylchloride in absolute benzene. The solution of acid chloride in benzene, obtained as above described, is added dropwise while stirring at room temperature to a solution of 2.4 g. of ammonia in 200 ml. of absolute dioxane, one keeps stirring for 2 hours at room temperature and heats it for one hour under reflux. The further processing is carried out as described in Example 23. M.P. 184.5–185° C. (from acetone/petroleum ether). Yield: 25% of theory.

*Analysis.*—Calculated for $C_{16}H_{14}N_2O_3$ (282.3) (percent): C, 68.06; H, 5.00; N, 9.92. Found (percent): C, 67.80; H, 5.04; N, 9.52.

EXAMPLE 37

2-methoxy-dibenz[b,f][1,4]oxazepin-11(10H)-one-10-propionamide was prepared from 2-methoxy-dibenz[b,f][1,4]oxazepin-11(10H)-one-10-propionitrile (M.P. 113–114° C. from cyclohexane) and concentrated sulfuric acid according to Example 13. M.P. 125–126° C. (from aqueous ethanol). Yield: 50% of theory.

*Analysis.*—Calculated for $C_{17}H_{16}N_2O_4$ (312.3) (percent): C, 65.38; H, 5.16; N, 8.97. Found (percent): C, 65.25; H, 5.37; N, 8.93.

EXAMPLE 38

4-methoxy-dibenz[b,f][1,4]oxazepin-11(10H)-one-10-acetamide was prepared from 4-methoxy-dibenz[b,f][1,4]oxazepin-11(10H)-one, potassiummethylate and chloroacetonitrile by the method described in Example E and saponification of the 4-methoxy-dibenz[b,f][1,4]oxazepin-11(10H)-one-10-acetonitrile, obtained as an oil, with concentrated sulfuric acid according to Example 3. M.P. 238–240° C. (from ethanol). Yield: 20% of theory.

*Analysis.*—Calculated for $C_{16}H_{14}H_2O_4$ (298.3) (percent): C, 64.42; H, 4.73; N, 9.39. Found (percent): C, 64.70; H, 4.89; N, 9.20.

EXAMPLE 39

2-chloro-dibenz[b,f][1,4]oxazepin-11(10H)-one-10-propionamide was prepared from 2-chloro-dibenz[b,f][1,4]oxazepin-11(10H)-one-10-propionitrile (M.P. 126–128° C. from ethanol) and concentrated sulfuric acid according to Example 13. M.P. 178–180° C. (from acetonitrile). Yield: 60% of theory.

*Analysis.*—Calculated for $C_{16}H_{13}ClN_2O_3$ (316.7) (percent): C, 60.67; H, 4.14; N, 8.84; Cl, 11.20. Found (percent): C, 60.75; H, 4.05; N, 8.64; Cl, 11.37.

EXAMPLE 40

7-chloro-dibenz[b,f][1,4]oxazepin-11(10H)-one-10-acetamide was prepared from 7-chloro-dibenz[b,f][1,4]oxazepin-11(10H)-one-acetonitrile (M.P. 159–160° C. from cyclohexane) and concentrated sulfuric acid according to Example 13. M.P. 213–214° C. (from ethanol). Yield: 65% of theory.

*Analysis.*—Calculated for $C_{15}H_{11}ClN_2O_3$ (302.7) (percent): N, 9.25; Cl, 11.71. Found (percent): N, 9.60; Cl, 11.80.

EXAMPLE 41

7-chloro-dibenz[b,f][1,4]oxazepin-11(10H)-one-10-acetic acid methylamide was prepared from 7-chloro-dibenz[b,f][1,4]oxazepin-11(10H)-one, potassiummethylate and chloroacetic acid methylamide according to Example 1. M.P. 252–253° C. (from ethanol). Yield: 80% of theory.

*Analysis.*—Calculated for $C_{16}H_{13}ClN_2O_3$ (316.7) (percent): C, 60.67; H, 4.14; N, 8.84; Cl, 11.20. Found (percent): C, 60.65; H, 4.10; N, 8.86; Cl, 11.16.

EXAMPLE 42

7-chloro-dibenz[b,f][1,4]oxazepin-11(10H)-one-10-acetic acid dimethylamide was prepared from 7-chloro-dibenz[b,f][1,4]oxazepin-11(10H)-one, potassium methylate and chloroacetic acid dimethylamide according to Example 1. M.P. 167–168° C. (from ethanol). Yield: 25% of theory.

*Analysis.*—Calculated for $C_{17}H_{15}ClN_2O_3$ (330.8) (percent): C, 61.73; H, 4.57; N, 8.47; Cl, 10.72. Found (percent): C, 61.60; H, 4.56; N, 8.46; Cl, 11.00.

EXAMPLE 43

7-chloro-dibenz[b,f][1,4]oxazepin-11(10H)-one-10-propionamide 7-chloro-dibenz[b,f][1,4]oxazepin-11(10H)-one-10-propionitrile was prepared from 7-chloro-dibenz[b,f][1,4]oxazepin-11(10H)-one and acrylonitrile according to Example B and saponified with concentrated sulfuric acid according to Example 3. M.P. 157–159° C. (from acetonitrile). Yield: 50% of theory.

*Analysis.*—Calculated for $C_{16}H_{13}ClN_2O_3$ (316.7) (percent): C, 60.67; H, 4.14; N, 8.84; Cl, 11.20. Found (percent): C, 60.45; H, 3.98; N, 8.63; Cl, 11.15.

EXAMPLE 44

8-chloro-dibenz[b,f][1,4]oxazepin-11(10H)-one-10-propionamide 8-chloro-dibenz[b,f][1,4]oxazepin-11(10H)-one-10-propionitrile (M.P. 105–107° C.) was prepared from 8-chloro-dibenz[b,f][1,4]oxazepin-11(10H)-one and acrylonitrile according to Example B and saponified with concentrated sulfuric acid according to Example 3. M.P. 160–161° C. (from acetonitrile). Yield: 20% of theory.

*Analysis.*—Calculated for $C_{16}H_{13}ClN_2O_3$ (316.7) (percent): C, 60.67; H, 4.14; N, 8.84; Cl, 11.20. Found (percent): C, 60.90; H, 4.20; N, 8.79; Cl, 11.10.

EXAMPLE 43

2-nitro-dibenz[b,f][1,4]oxazepin-11(10H)-one-10-propionamide was prepared from 2-nitro-dibenz[b,f][1,4]oxazepin-11(10H)-one-10-propionitrile (M.P. 151–153° C. from toluene) and concentrated sulfuric acid according to the method described in Example 3. M.P. 161–163° C. (from ethylacetate). Yield: 60% of theory.

*Analysis.*—Calculated for $C_{16}H_{13}N_3O_5$ (327.3) (percent): C, 58.72; H, 4.00; N, 12.84. Found (percent): C, 58.75; H, 4.08; N, 12.94.

The compounds according to the present invention, that is, those embraced by Formula I above and their nontoxic, pharmacologically acceptable acid addition salts, have useful pharmacodynamic properties. More particularly, they exhibit sedative, anticonvulsive, analgesic, antipyretic, antiphlogistic, hypotensive and anti-strychnine activities in warm-blooded animals. Particularly effective as hypotensives are those compounds of the invention wherein A is an acyclic hydrocarbon of 2 carbon atoms, whereas those wherein A is methylene are particularly effective as anticonvulsives.

For pharmaceutical purposes the compounds according to the present invention are administered to warm-blooded animals perorally or parenterally, preferably perorally, polished with beeswax. Each coated pill weighs approximately 200 mgm. and contains 40 mgm. of the dibenzoxazepinone compound, 5 mgm. of the benzothiadiazine compound and 0.2 mgm. of reserpine.

Although the above dosage unit examples illustrate only a few of the compounds according to the invention as active ingredients, it should be understood that any of the other compounds embraced by Formula I or a non-toxic acid addition salt thereof may be substituted for the particular benzoxazepinone compound illustrated in Examples 46 through 50. Moreover, the amount of active ingredient in these examples may be varied to achieve the dosage unit range set forth above, and the amount and nature of the inert pharmaceutical carrier ingredients may be varied to meet particular requirements.

While the present invention has been illustrated with the aid of certain specific embodiments, it will be readily apparent to others skilled in the art that the invention is not limited to these embodiments and that various changes and modifications may be made without departing from the spirit of the invention or the scope of the appended claims.

We claim:

1. A compound of the formula

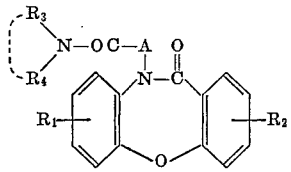

wherein:

$R_1$ and $R_2$ are each hydrogen, halogen, methyl, methoxy and nitro, $R_3$ is hydrogen, lower alkyl, hydroxy-lower alkyl, lower alkenyl, cyclohexyl, carbamoyl, lower di-alkylamino-lower alkyl or amino, $R_4$ is hydrogen, lower alkyl, hydroxy-lower alkyl or lower alkenyl, $R_3$ and $R_4$, together with each other and the nitrogen atom to which they are attached, are morpholino, piperidino, lower alkyl-piperidino, hexamethyleneimino or N'-methyl-piperazino, and A is lower alkylene, or a non-toxic, pharmacologically acceptable acid addition salt thereof.

2. A compound according to claim 1, wherein $R_1$, $R_2$, $R_3$ and $R_4$ are hydrogen and A is methylene.

3. A compound according to claim 1, wherein $R_1$, $R_2$, $R_3$ and $R_4$ are hydrogen and A is ethylene.

4. A compound according to claim 1, wherein $R_1$, $R_2$ and $R_3$ are hydrogen, $R_4$ is methyl and A is methylene.

5. A compound according to claim 1, wherein $R_1$ is 7-chloro, $R_2$, $R_3$ and $R_4$ are hydrogen, and A is methylene.

6. A compound according to claim 1, wherein $R_2$ is 2-chloro, $R_1$, $R_3$ and $R_4$ are hydrogen, and A is ethylene.

7. A compound according to claim 1, wherein $R_1$ is 7-chloro, $R_2$, $R_3$ and $R_4$ are hydrogen, and A is ethylene.

8. A compound according to claim 1, wherein $R_2$ is 2-methyl, $R_1$, $R_3$ and $R_4$ are hydrogen, and A is ethylene.

9. A compound according to claim 1, wherein $R_2$ is 2-nitro, $R_1$, $R_3$ and $R_4$ are hydrogen, and A is ethylene.

10. A compound according to claim 1, wherein $R_1$ is 8-methyl, $R_2$, $R_3$ and $R_4$ are hydrogen, and A is ethylene.

References Cited
UNITED STATES PATENTS

| | | | |
|---|---|---|---|
| 3,337,563 | 8/1967 | Schmutz et al. | 260—239.3 |
| 3,367,930 | 2/1968 | Schmutz et al. | 260—239.3 |
| 3,451,776 | 6/1969 | VanDijk et al. | 23—219 |

HENRY R. JILES, Primary Examiner

R. T. BOND, Assistant Examiner

U.S. Cl. X.R.

424—244, 248, 250, 267

PO-1050
(5/69)

UNITED STATES PATENT OFFICE
CERTIFICATE OF CORRECTION

Patent No. 3,544,561          Dated December 1, 1970

Inventor(s) Gunther Schmidt, Hans Machleidt and Hans Klupp

It is certified that error appears in the above-identified patent and that said Letters Patent are hereby corrected as shown below:

Col. 6, line 35, "[1,43]" should read --[1,4]--.
Col. 7, lines 32 and 33 should be erased.
Col. 9, line 24, "10.78" should read --10.79--.

Col. 10, line 23, "67.45" should read --67.40--;
" 33, "9.29" should read --9.92--;
" 44, second "H" should read --N--;
" 45, insert "H," before "5.52".

Col. 12, line 63, "70.89" should be --70.80--.

Col. 14, line 52, "Example 43" should read --Example 45--.

Col. 15, line 11, "(1H)" should read --(10H)--.

Col. 16, line 17, "compound" should read --compounded--.

Col. 18, line 31, "3,337,563" should read --3,337,536--.

Signed and sealed this 28th day of September 1971.

(SEAL)
Attest:

EDWARD M. FLETCHER, JR.
Attesting Officer

ROBERT GOTTSCHALK
Acting Commissioner of Patents